Figure 1:
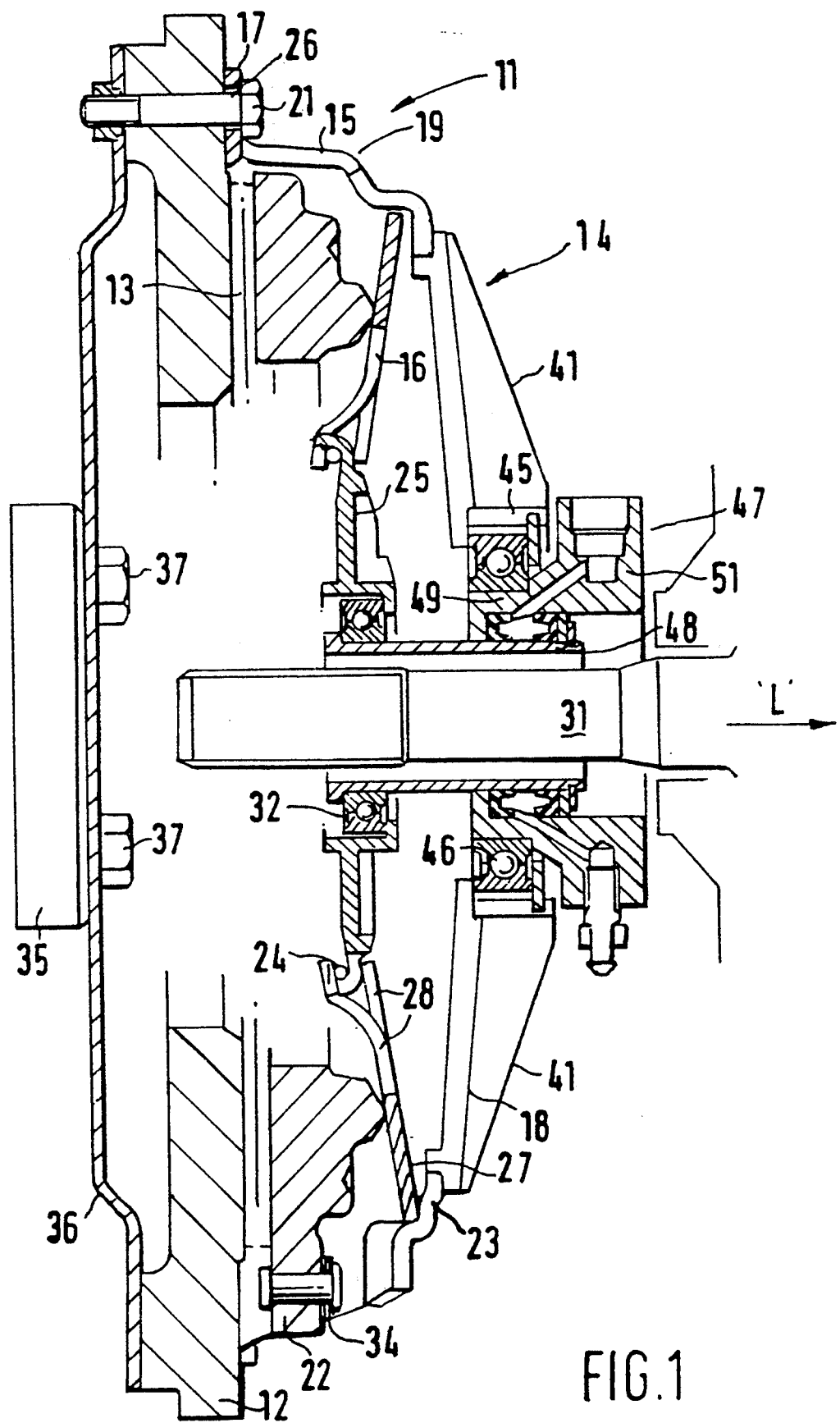

United States Patent [19]
Cooke et al.

[11] Patent Number: 5,366,054
[45] Date of Patent: Nov. 22, 1994

[54] FRICTION CLUTCH COVER ASSEMBLIES

[75] Inventors: Richard D. M. Cooke, Warwick; Robert J. Murphy, Leamington Spa, both of United Kingdom

[73] Assignee: Automotive Products, plc, Leamington Spa, United Kingdom

[21] Appl. No.: 50,050

[22] Filed: Apr. 29, 1993

[30] Foreign Application Priority Data

Nov. 2, 1990 [GB] United Kingdom ............... 9023913

[51] Int. Cl.⁵ .......................................... F16D 25/08
[52] U.S. Cl. ........................... 192/70.17; 192/85 CA; 192/91 A
[58] Field of Search ........... 192/70.17, 85 CA, 89 PL, 192/91 A, 98; 74/574; 464/71, 85, 182

[56] References Cited

U.S. PATENT DOCUMENTS 4,102,446  7/1978  Rist .................... 192/91 A
5,205,387  4/1993  Checa ................. 192/85 CA

FOREIGN PATENT DOCUMENTS 2-229939  9/1990  Japan ..................... 74/574

Primary Examiner—Richard M. Lorence
Attorney, Agent, or Firm—Paul E. Milliken; Lee A. Germain

[57] ABSTRACT

A friction clutch assembly for an internal combustion engine and which includes a flywheel, a driven plate, a coaxial annular clutch cover assembly including a spring urging a pressure plate towards the flywheel to clamp the driven plate therebetween. The clutch assembly is attachable to the vehicle crankshaft via an intermediate plate which transmits the torque load from the crankshaft to the flywheel. A clutch release cylinder is mounted on the cover and is operable to relieve the clamp load acting on the driven plate.

7 Claims, 2 Drawing Sheets

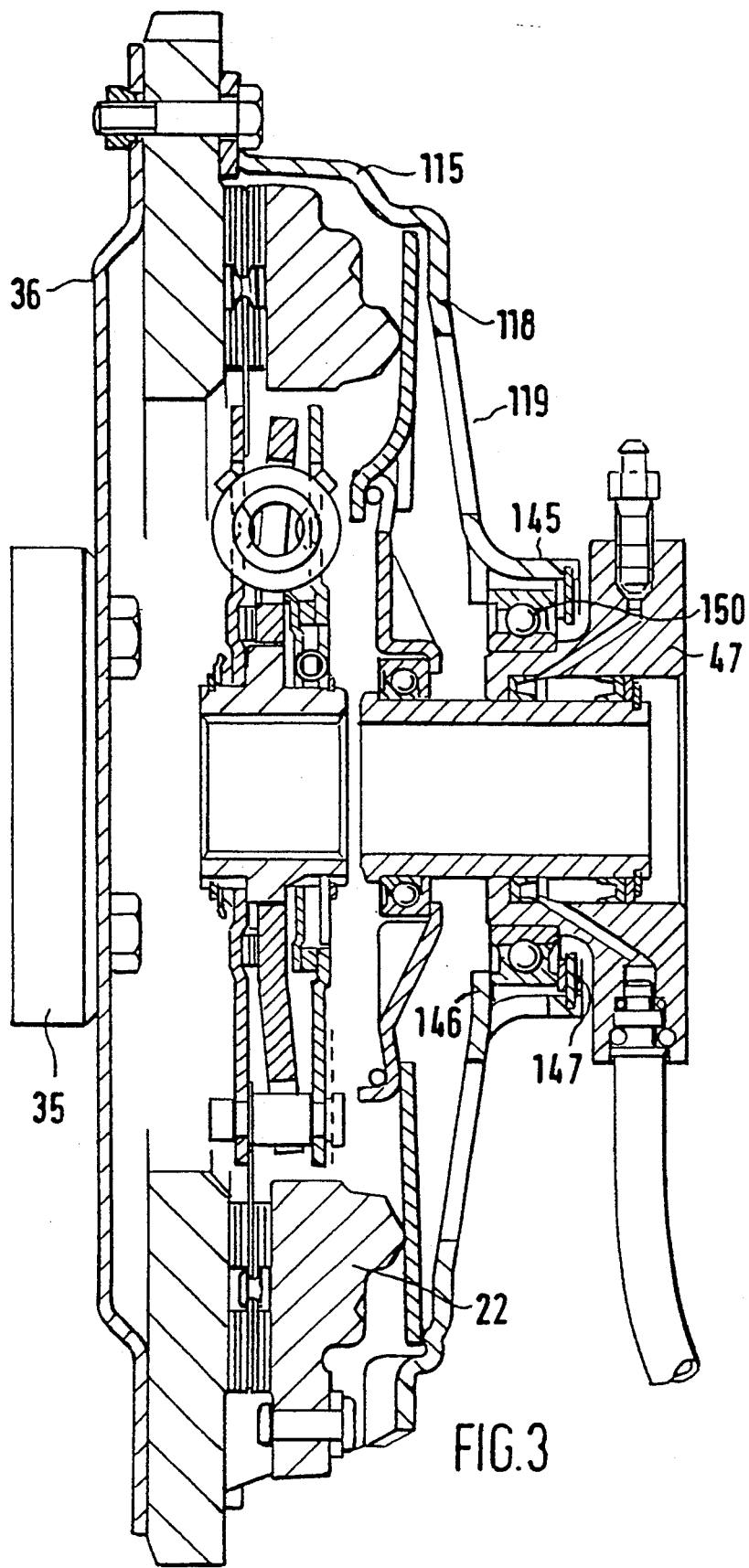
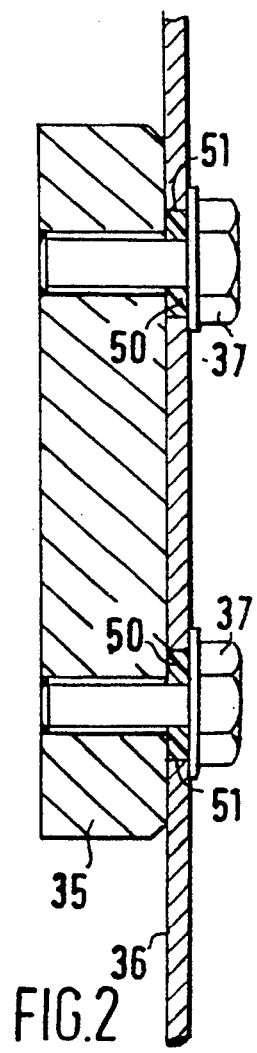
FIG. 3
FIG. 2

FRICTION CLUTCH COVER ASSEMBLIES

This invention relates to friction clutch assemblies for motor vehicles.

In a typical motor vehicle friction clutch, a driven plate, rotationally fast with the input shaft of a gearbox, is sandwiched between a flywheel on the engine crankshaft and a pressure plate. The pressure plate is usually mounted in a clutch cover assembly, and the cover assembly is in turn mounted on the flywheel. The pressure plate is rotationally fast with a cover and the flywheel, and is biased away from the cover by spring means to trap the driven plate between itself and the flywheel. Drive straps hold the pressure plate rotationally fast with the cover and allow the pressure plate to move axially so as to enable the driven plate to be released or clamped between the flywheel and pressure plate as required.

In a typical motor vehicle, a clutch release bearing acts against the ends of the levers associated with the spring means in order to release the driven plate. Conventionally the release bearing is mounted on a clutch release mechanism arranged concentrically of the gear box input shaft within the clutch bell housing but independently of the clutch cover.

A problem associated with the conventional clutch assembly is that the clutch release load is transmitted through the clutch cover to the flywheel and hence onto the end of the engine crankshaft. Therefore in a typical engine the crankshaft is mounted adjacent thrust washers to overcome this problem. Furthermore because the flywheel is attached to the crankshaft it is difficult to balance the complete clutch assembly of cover, flywheel and driven plate. It is therefore advantageous if the clutch assembly can be attached to the engine crankshaft as an already assembled and balanced unit.

The invention provides a cover, and clutch release mechanism as a single assembly, which is attachable to the crankshaft through an intermediate plate. According to the invention there is provided a pull type friction clutch assembly for an internal combustion engine and which includes a flywheel, a driven plate adjacent the flywheel, a coaxial annular clutch cover assembly mounted on one side of the flywheel to envelope the driven plate, including a diaphragm spring having radially inwardly projecting fingers and urging a pressure plate towards the flywheel to clamp the driven plate therebetween, the clutch assembly being attachable to the vehicle crankshaft via an intermediate plate which transmits the torque load from the crankshaft to the flywheel, characterised in that an annular hydraulic slave cylinder is mounted concentrically on the cover via a bearing which allows the slave cylinder to rotate relative to the cover, the slave cylinder acting on the radially inner ends of the diaphragm spring fingers and being operable to move the inner ends of the fingers away from the flywheel to relieve the clamp load acting on the driven plate.

Because the clutch release means is mounted on the cover, during the clutch release operation all the loads acting on the spring means are balanced within the clutch assembly itself so that there are no extra loads acting on the end of the crankshaft. This allows the intermediate plate to be a thin plate because it supports no axial clutch release load.

Preferably there is some torsional and/or coaxial resilience in the intermediate plate located operably between the attachment points for the flywheel and the attachment points for the crankshaft.

The invention will be described by way of example and with reference to the accompanying drawing in which:

FIG. 1 is a cross-section of a typical friction clutch assembly mounted on a vehicle crankshaft, FIG. 2 is a section through a crankshaft end showing a second embodiment of the invention, and FIG. 3 is a cross-section through a second friction clutch assembly also according to the invention.

FIG. 1 illustrates a motor vehicle friction clutch assembly 11 comprising a flywheel 12, a driven plate 13, shown in dotted outline only and an annular cover assembly 14. The cover assembly 14 comprises an annular cover 15 which is secured to one side of the flywheel 12, a pressure plate 22 located coaxially within the cover 15, and a coaxial diaphragm spring 16 located between the cover and the pressure plate 22 towards the flywheel to clamp the driven plate 13 therebetween. The cover 15 comprises two parts, a substantially cylindrical part 19 forming a sidewall having a radially outwardly projecting flange 17 at its open end and an end wall 18 projecting radially inwardly at the other axial end of the cover. The outwardly projecting flange 17 has a plurality of holes 26 therein whereby the cover is attached by fasteners preferably bolts 21, to the flywheel 12.

The spring 16 is a frustoconical plate spring coned away from endwall 18 towards pressure plate 22 and has a radially outer continuous annular portion 27 with a plurality of spaced radially inwardly extending fingers 28 projecting from the radially inner periphery of the annular portion 27. The radially outer margin of the spring 16 pivots against the cover 15 on an annular rib 23 on the cover 15.

The inner margin of the annular portion 27 of the spring 16 acts against the pressure plate 22. The radially inner ends of the spring finger 28 are secured by a circlip 24 to a release plate 25 so that axial movement of the release plate 25 causes all the spring fingers 28 to operate simultaneously. When the cover assembly is mounted on the flywheel 12 the pressure plate 22 is biased by the spring 16 to clamp the driven plate 13 between itself and the flywheel.

The hub of the driven plate 13 fitted onto a gearbox input shaft 31 by means of splines so that the driven plate is rotationally fast with the shaft. To release the clutch, a release load is applied to the radially inner ends of the spring fingers 28, via the clutch release plate 25 to move the inner ends of the fingers away from the flywheel 12, causing the outer annular portion 27 of the spring to pivot about the rib 23 and move away from the pressure plate 22. When the clutch is re-engaged the reverse operation takes place.

The pressure plate 22 has an annular cast iron body with the friction surface on one axial side for engagment with the driven plate 13 and is made rotationally fast with the cover 15 by three circumferentially spaced sets of drive straps 34 which extend between the cover and lugs on the outer periphery of the pressure plate 22. The drive straps 34 allow for axial movement of the pressure plate 22 relative to the cover 15 whilst holding the two rotationally fast.

The flywheel 12 is mounted on the end 35 of a crankshaft of an internal combustion engine, via an intermediate plate 36. The intermediate plate 36 is attached to the end 35 of the crankshaft by four bolts 37 arranged on a pitch circle and passing through co-operating holes in the centre of the intermediate plate 36. The intermediate plate 36 is attached at its outer peripheral margin to the flywheel 12, preferably by the same fasteners 26 by which the cover assembly 14 is attached to the flywheel.

The intermediate plate 36 therefore acts to transmit torque from the end of the crankshaft 35 to the flywheel.

The cover 15 on its radially inwardly projecting end wall 18 has a central tubular housing 45 supported by radial ribs 41 in which is mounted via a bearing race 46, an annular hydraulic clutch slave cylinder 47 arranged in use concentrically with the gear box input shaft 31. The slave cylinder 47 has a cylinder body 49 mounted in the bearing race 46, and a piston 48 in the form of an input sleeve surrounding the gear box input shaft 31 and on which a clutch release bearing 32 is mounted so that activation of the slave cylinder 47 moves the piston 48 away from the flywheel and via the plate 25 operates the spring fingers 28 to release the driven plate 13.

The slave cylinder 47 is held stationery relative to a bell housing by a simple rigid fixture on the gearbox housing and the clutch assembly 11 rotates relative thereto through the bearing races 32 and 46.

When the release load 'L' is applied in the direction of arrow L, the spring 16 pivots on the rib 23 and since both the release load 'L' and the load in the spring are reacted on the cover in opposite directions there is in effect no excess load acting on the crankshaft 35 during the release of the clutch.

This means that the intermediate plate 36 can be relatively thin between (2-3mm) since it is not subject to larger axial loads. Such a thin plate 36 transmitting loads from the crankshaft 35 to the flywheel 12 my be termed a "Flex Plate".

It will be apparent that to use such a flex plate 36 the moment the clutch assembly 11 to the crankshaft is advantageous because it allows for the clutch assembly to be supplied as a complete assembly, including flywheel, which can be balanced for high speed rotative movement as a unit and attached to the crankshaft 35 as a complete unit and not as separate parts in the conventional manner.

In FIG. 2 there is illustrated a modification of the Clutch assembly described with reference to FIG. 1 and the same reference numerals will be used for the same parts. In this embodiment of the invention some torsional resilience is placed in the load transfer path between the crankshaft end 35 and the flywheel 12.

This is most simply achieved by the bolts 37 which connect the flex plate 36 to the crankshaft passing through elastomeric bushings 50 accommodated in holes 51 in the flex plate.

Alternatively (but not illustrated) the flex plate 36 could comprise two relatively rotational parts, an inner part attached to the crankshaft 35 and an outer part attached to the flywheel 12.

A resilient means is then interposed between the two parts, in a manner well famous for clutch driven plates to restrain relative rotation between the parts.

In FIG. 3, there is illustrated an embodiment in which annular clutch cover 115 is a single pressing havings a radially inwardly projection endwall 118 with cooling holes 119 therein and a raised central boss 145 extending axially away from the pressure plate 22. Four spaced integral tabs 146 extend radially inwardly of the boss 145, to support a bearing race 150 which is held in position by a circlip 147. In other respects this embodiment is similar to that of FIG. 1.

We claim:

1. A pull type friction clutch assembly for an internal combustion engine and which includes a flywheel, a driven plate adjacent the flywheel, a coaxial annular clutch cover assembly mounted on one side of the flywheel to envelope the driven plate and including a diaphragm spring having radially inwardly projecting fingers and urging a pressure plate towards the flywheel to clamp the driven plate therebetween, the clutch assembly being attachable to an associated vehicle crankshaft via an intermediate plate which transmits the torque load from the crankshaft to the flywheel, and an annular hydraulic slave cylinder mounted on the cover via a bearing arranged to support the slave cylinder in a concentric relationship surrounding an associated clutch driven shaft, the bearing allowing the slave cylinder to rotate relative to the cover, the slave cylinder acting on the radially inner ends of the diaphragm spring fingers and being operable to move the inner ends of the fingers away from the flywheel to relieve the clamp load acting on the driven plate.

2. A pull type friction clutch assembly for an internal combustion engine and which includes a flywheel, a driven plate adjacent the flywheel, a coaxial annular clutch cover assembly mounted on one side of the flywheel to envelope the driven plate and including a diaphragm spring having radially inwardly projecting fingers and urging a pressure plate towards the flywheel to clamp the driven plate therebetween, the clutch assembly being attachable to an associated vehicle crankshaft via an intermediate plate which transmits the torque load from the crankshaft to the flywheel, the intermediate plate being secured to the flywheel by a fastening means which also mounts the clutch cover on the flywheel, and an annular hydraulic slave cylinder mounted on the cover via a bearing arranged to support the slave cylinder in a concentric relationship surrounding an associated clutch driven shaft, the bearing allowing the slave cylinder to rotate relative to the cover, the slave cylinder acting on the radially inner ends of the diaphragm spring fingers and being operable to move the inner ends of the fingers away from the flywheel to relieve the clamp load acting on the driven plate.

3. An assembly as claimed in claim 2 wherein there is further provided a release plate which is fitted to the radially inner ends of the spring fingers so that the release load is applied to all the fingers simultaneously through the release plate.

4. An assembly as claimed in claim 2 wherein the cover comprises two parts, a substantially cylindrical part for attachment to the flywheel and a substantially radially extending end plate in which the bearing and slave cylinder are mounted.

5. A friction clutch assembly as claimed in claim 2 wherein the intermediate plate has some torsional resilience located operably between the attachment points for the flywheel and the attachment points for the crankshaft.

6. A friction clutch cover assembly as claimed in claim 2, wherein the intermediate plate is attached to the crankshaft by fastening means surrounded by elastomeric bushes.

7. A friction clutch assembly as claimed in claim 2 wherein the intermediate plate comprises an inner portion for attachment to the flywheel and resilient portion for attachment to the crankshaft and outer means acting between the inner and outer portions to allow restrained limited rotational movement between said portions.

* * * * *